(12) United States Patent
Nitoh et al.

(10) Patent No.: US 11,512,019 B2
(45) Date of Patent: Nov. 29, 2022

(54) APPARATUS AND METHOD FOR TREATING GYPSUM

(71) Applicant: YOSHINO GYPSUM CO., LTD., Tokyo (JP)

(72) Inventors: Kouji Nitoh, Tokyo (JP); Takeshi Takenaka, Tokyo (JP); Masaru Yoshida, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 855 days.

(21) Appl. No.: 16/321,613

(22) PCT Filed: Jul. 14, 2017

(86) PCT No.: PCT/JP2017/025828
§ 371 (c)(1),
(2) Date: Jan. 29, 2019

(87) PCT Pub. No.: WO2018/030077
PCT Pub. Date: Feb. 15, 2018

(65) Prior Publication Data
US 2021/0292229 A1    Sep. 23, 2021

(30) Foreign Application Priority Data
Aug. 10, 2016    (JP) .............................. JP2016-157062

(51) Int. Cl.
*C04B 11/036*    (2006.01)
*C04B 11/024*    (2006.01)
*C04B 11/06*    (2006.01)

(52) U.S. Cl.
CPC .......... *C04B 11/036* (2013.01); *C04B 11/024* (2013.01); *C04B 11/06* (2013.01)

(58) Field of Classification Search
CPC ..... C04B 11/036; C04B 11/024; C04B 11/06; C04B 11/00; B01J 8/38; C01F 11/46
See application file for complete search history.

(56) References Cited

U.S. PATENT DOCUMENTS 4,915,623 A    4/1990    Ball et al.
5,013,237 A    5/1991    Bergounhon
(Continued)

FOREIGN PATENT DOCUMENTS

CA    2807961    3/2012
EP    86310237.2    12/1986
(Continued)

OTHER PUBLICATIONS

Venkiteswaran et al., "CFD Simulation of Air Flow through the Annular Distributor of a Swirling Fluidized Bed", Applied Mechanics and Materials 700:2014-10, pp. 619-625, (Jan. 2015). (Year: 2015).*

(Continued)

*Primary Examiner* — Michael N Orlando
*Assistant Examiner* — Christopher W Raimund
(74) *Attorney, Agent, or Firm* — Staas & Halsey LLP

(57) ABSTRACT

A fluidized-bed-type apparatus and method for treating gypsum, which activates or improves fluidity of gypsum powder to promote an effect of treatment of gypsum, such as modification or homogenization of the gypsum powder. The apparatus for treating gypsum includes a reactor vessel, a conditioned air supply port, a horizontal partition wall and a plurality of stationary vanes. The wall allows a conditioned air flow to flow upward into a reaction region. The vanes are arranged at an angular interval in a circumferential direction. A fluidized bed of calcined gypsum is provided in the vessel. The vane deflects the conditioned air flow flowing upward into the reaction region, toward a radially outward and circumferential direction of the reaction region. The calcined gypsum makes a saltational fluid motion or saltational movement in the vessel with the air flow.

20 Claims, 9 Drawing Sheets

(56) References Cited

U.S. PATENT DOCUMENTS

| | | | |
|---|---|---|---|
| 5,437,850 A | 8/1995 | Kroehl et al. | |
| 6,475,462 B1 | 11/2002 | Dodson et al. | |
| 6,883,442 B1* | 4/2005 | Groszek | C10J 3/482 |
| | | | 110/204 |
| 2006/0010711 A1 | 1/2006 | Falinower | |
| 2011/0034318 A1* | 2/2011 | Gasafi | B01J 6/004 |
| | | | 501/150 |

FOREIGN PATENT DOCUMENTS

| | | |
|---|---|---|
| JP | 2571374 | 1/1997 |
| JP | 2005-528310 | 9/2005 |
| JP | 2013-535401 | 9/2013 |

OTHER PUBLICATIONS

Shu et al., "Hydrodynamic study of a toroidal fluidized bed reactor", Chemical Engineering and Processing: Process Intensification, vol. 39, Issue 6, 2000, pp. 499-506. (Year: 2000).*
Extended European Search Report dated Jun. 21, 2019 in corresponding European Patent Application No. 17839150.4 (9 pages).
International Search Report dated Mar. 10, 2017 in corresponding International Application No. PCT/JP2017/025828.

\* cited by examiner

APPARATUS AND METHOD FOR TREATING GYPSUM

CROSS-REFERENCE TO RELATED APPLICATIONS

This application is a U.S. National Stage Application, which claims the benefit under 35 U.S.C. § 371 of International Patent Application No. PCT/JP2017/025828 filed on Jul. 14, 2017, which claims the foreign priority benefit under 35 U.S.C. § 119 of Japanese Patent Application No. 2016-157062, filed Aug. 10, 2016, the contents of which are incorporated herein by reference.

TECHNICAL FIELD

The present invention relates to an apparatus and method for treating gypsum, and more specifically, such an apparatus and method for fluidizing a deposit of accumulated particles or powder of gypsum (referred to as "gypsum powder" hereinafter) by an upward gaseous fluid flow, thereby performing treatment of gypsum, such as modification, homogenization or calcination of the gypsum powder; adjustment of moisture content in the gypsum powder; mixing of additives or incorporation of moisture into the gypsum powder; and so forth.

BACKGROUND ART

Gypsum based boards produced from gypsum, such as gypsum boards, plaster plates and so forth, are widely available as architectural interior finish materials and so forth. The gypsum may be generally classified into gypsum dihydrate (dihydration product of calcium sulphate), gypsum hemihydrate (hemihydration product of calcium sulphate), and anhydrous gypsum (anhydrous product of calcium sulphate), in accordance with existing state of combined water. In general, calcined gypsum (stucco or calcined plaster) obtained by calcination of the gypsum dihydrate is used as a raw material for production of gypsum based boards. The calcined gypsum is produced by a calcination process, wherein raw gypsum, such as natural gypsum or chemical gypsum, is calcined solely, or a mixture of different kinds of raw gypsum is heated (calcined). An oven-type furnace (direct-heating-type furnace), an indirect-heating-type furnace and so forth are used as a gypsum calciner for producing the gypsum hemihydrate and so forth, as described in Japanese Patent Publication No. 2571374 (Patent Literatures 1). The gypsum dihydrate ($CaSO_4 \cdot 2H_2O$) is converted to the gypsum hemihydrate ($CaSO_4 \cdot \frac{1}{2}H_2O$) by a calcination process. In general, the calcined gypsum obtained by the calcination process includes not only the gypsum hemihydrate but also insufficiently calcined gypsum (gypsum dihydrate), excessively calcined gypsum (III type anhydrous gypsum ($CaSO_4$)) and so forth.

It is disclosed in, e.g., Japanese patent laid-open publication No. 2013-535401 (Patent Literature 2) that process gas (high temperature and high humidity gas) generated in a furnace or reaction vessel of a gypsum calciner or an apparatus for calcination of gypsum is delivered through a fluid passage together with the calcined gypsum, and that the calcined gypsum and the process gas are introduced into a gypsum plaster cooler. This cooler is an apparatus for treating gypsum which is intended to homogenize the calcined gypsum and reduce the amount of mixing water for slurrying the calcined gypsum. This cooler is arranged to introduce the process gas of the gypsum calcination apparatus, which includes a relatively large amount of moisture (steam), into a stabilization zone of the cooler together with the calcined gypsum. According to such a gypsum plaster cooler, it is assumed that the III type anhydrous gypsum contained in the calcined gypsum can be converted to the gypsum hemihydrate in the stabilization zone by the moisture contained in the process gas and that a particle size distribution of the gypsum powder can be improved by rotating and fluidizing the gypsum powder as a whole.

Furthermore, a homogenizer (an apparatus for homogenizing the calcined gypsum) is known in the art, which homogenizes the calcined gypsum extracted from the calciner, so as to be the calcined gypsum substantially consisting of the gypsum hemihydrate, wherein insufficiently calcined gypsum (gypsum dihydrate) and excessively calcined gypsum (anhydrous gypsum) contained in the calcined gypsum are converted to the gypsum hemihydrate. The homogenizer is provided with a reaction region which retains the gypsum dihydrate and the anhydrous gypsum together with the gypsum hemihydrate. Air or the like conditioned at a predetermined temperature or a predetermined humidity is introduced into the reaction region. The gypsum dihydrate and the anhydrous gypsum contained in the calcined gypsum are agitated in the reaction region, and they are converted to the gypsum hemihydrate by a dehydration reaction or a hydration reaction. As a result, the percentages of the contents of the gypsum dihydrate and the anhydrous gypsum are reduced, and the percentage of the content of the gypsum hemihydrate is increased. Thus, the calcined gypsum is homogenized to be the gypsum hemihydrate with less "uneven calcination".

CITATION LIST

Patent Literatures

Patent Literature 1: Japanese Patent Publication No. 2571374

Patent Literature 2: Japanese patent laid-open publication No. 2013-535401

SUMMARY OF INVENTION

Technical Problem

The apparatus for treating gypsum, such as the gypsum plaster cooler or the homogenizer as set forth above, functions to fluidize the accumulative deposit of the calcined gypsum containing the gypsum hemihydrate, the gypsum dihydrate and the anhydrous gypsum, with use of the gaseous fluid flow of the air, process gas or the like, so that the dehydration reaction and the hydration reaction of the gypsum dihydrate and the anhydrous gypsum proceed with heat exchange between the gypsums and so forth, whereby the gypsum dihydrate and the anhydrous gypsum in the calcined gypsum are converted to the gypsum hemihydrate. However, even if a method for introducing or flowing the air or process gas into the reaction region can be improved or optimized, it is still difficult to sufficiently agitate the calcined gypsum, and therefore, homogenization of calcined gypsum is limited in its further promotion.

Moreover, as regards the aforementioned gypsum plaster cooler, the cooler has to be provided with a rotary driving device rotating a body of the cooler for revolving the gypsum powder, a control system for the driving device, and so forth. Therefore, its mechanical structure or arrangement is complicated and increased in size. This results in difficulty of maintenance of the system, increase in the running cost of the cooler, and so forth.

It is an object of the present invention to provide a fluidized-bed-type apparatus and method for treating gypsum, which is adapted to fluidize a deposit of gypsum powder accumulated in a bottom part of a reaction region with use of gaseous fluid flow ejected upward from the bottom part of the reaction region, wherein the fluidity of the gypsum powder can be activated or improved and the treatment of gypsum, such as modification or homogenization of gypsum powder, can be promoted.

Solution to Problem

The present invention provides an apparatus for treating gypsum, which includes a reactor vessel, a gypsum feeder and a gaseous fluid flow supply device, wherein the reactor vessel has an inner wall surface with a circular or annular horizontal cross-section or configuration, the gypsum feeder feeds gypsum powder into a reaction region in the reactor vessel, and the gaseous fluid flow supply device is positioned in a bottom part of the reaction region to provide an upward gaseous fluid flow in the reaction region, whereby the gypsum powder accumulated in the bottom part of the reaction region is agitated by said flow; comprising:

a plurality of stationary vanes extending toward said inner wall surface from a support which is positioned in a center area of the reaction region, wherein the vanes are so arranged as to be spaced from each other at an angular interval in a circumferential direction of said reaction region; and wherein the adjacent vanes form a fluid path for said gypsum powder and said flow introduced into the reaction zone, and the fluid path is so inclined as to deflect said flow toward a radially outward and circumferential direction of said reaction region.

The present invention also provides a method for homogenizing calcined gypsum with use of the above apparatus for treating gypsum:

(1) wherein the upward gaseous fluid flow introduced into the reaction region from the bottom part of the reaction region is guided toward the radially outward and circumferential direction of the reaction region by the vanes, and the gypsum powder is fluidized in the radially outward and circumferential direction of the reaction region, owing to deflection of the flow, whereby the gypsum powder is energized in a circumferential direction of a body of the reactor vessel, or movement of the gypsum powder is augmented in the circumferential direction in a vicinity of the inner wall surface; or (2) wherein a gypsum supply passage of the gypsum feeder is connected to an apparatus for gypsum calcination or a gypsum calciner, so that the reaction region is fed with the calcined gypsum produced by the apparatus for gypsum calcination or the gypsum calciner, whereby a treatment for modifying or homogenizing the calcined gypsum is performed.

From another aspect, the present invention provides a method for treating gypsum, in which the gypsum powder is fed into a reaction region of a reactor vessel having an inner wall surface with a circular or annular horizontal cross-section or configuration, and an upward gaseous fluid flow is spouted from a bottom surface of the reaction region to agitate the gypsum powder in the reaction region, thereby performing modification or homogenization of the gypsum powder, incorporation of moisture into the gypsum powder, exposure treatment (exposure to atmospheric air) of the gypsum powder, mixing of an additive in the gypsum powder, calcination of the gypsum powder, or adjustment of a moisture content in the gypsum powder:

wherein a plurality of stationary vanes are supported by a support positioned in a center area of said reaction region and are arranged to be circumferentially spaced at an angular interval from each other; and wherein the upward gaseous fluid flow introduced into the reaction region from a bottom surface of the reaction region is guided toward a radially outward and circumferential direction of the reaction region by said vanes, and the gypsum powder is fluidized toward the radially outward and circumferential direction of the reaction region by deflection of said flow, whereby the gypsum powder is energized in a circumferential direction of the reactor vessel, or movement of the gypsum powder in the circumferential direction is augmented in a vicinity of said inner wall surface.

According to the arrangement of the present invention as set forth above, the upward gaseous fluid flow introduced into the reaction region from the bottom part of the reaction region is deflected toward the radially outward and circumferential direction of the reaction region due to a deflecting or guiding action of the vane, so that the flow moves to a peripheral zone of the reactor vessel, whereby the gypsum in the vicinity of the inner wall surface of the reaction region is energized toward the circumferential direction or the movement of the gypsum toward the circumferential direction is augmented in the vicinity of the inner wall surface. According to the apparatus and method of the present invention, the fluidization of the gypsum powder can be activated or improved and the treatment of gypsum, such as modification or homogenization of the gypsum powder, can be promoted, since the gypsum powder is agitated over the whole reaction region by deflection of the upward gaseous fluid flow. For instance, if the present invention is applied to a homogenizer (an apparatus for homogenizing the calcined gypsum), the proportion of the gypsum hemihydrate relative to the calcined gypsum can be increased after homogenization, and therefore, the calcined gypsum produced in the gypsum calciner can be homogenized to be calcined gypsum with less "uneven calcination".

Advantageous Effects of Invention

According to the present invention, it is possible to provide the fluidized-bed-type apparatus and method for treating gypsum, which is adapted to fluidize the deposit of the gypsum powder accumulated in the bottom part of the reaction region with use of the gaseous fluid flow ejected upward from the bottom part of the reaction region, wherein the fluidity of the gypsum powder can be activated or improved and the treatment of gypsum, such as modification or homogenization of the gypsum powder, can be promoted.

DESCRIPTION OF EMBODIMENTS

Figure 1:
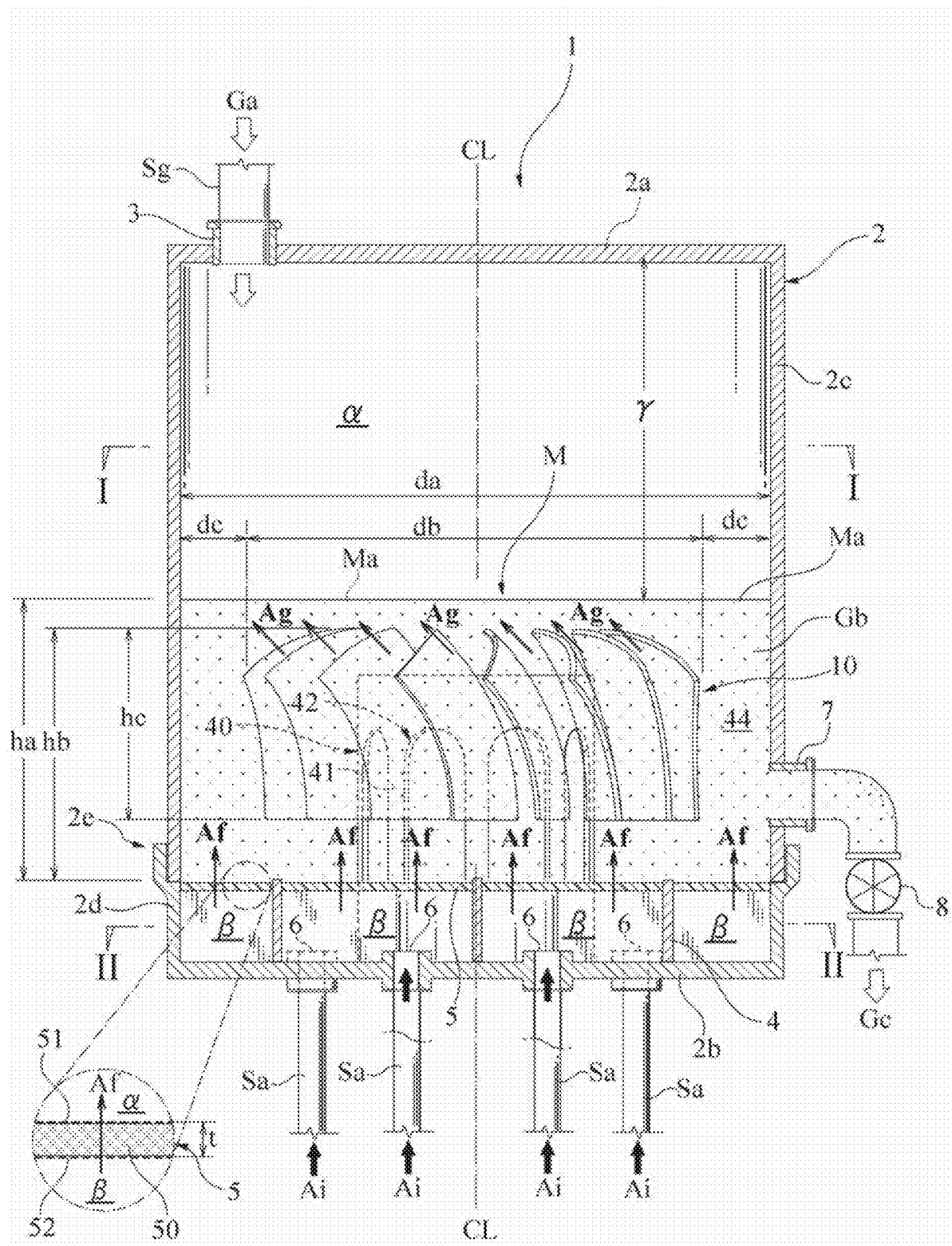
FIG. 1 is a vertical cross-sectional view illustrating a structure of a homogenizer according to a preferred embodiment of the present invention.

Preferably, the stationary vanes adjacent to each other define the aforementioned fluid path which opens toward a peripheral zone of the reaction region and which extends upward in a direction generally inclined relative to a vertical direction and opens toward an upper space. As regards angular positions of outer and inner ends of a lower part of the vane around a center axis of the reactor vessel or reaction region, in a preferred embodiment of the present invention, the outer end of the lower part of the vane residing backward in a direction of deflection of the flow is located at an angular position forward in the direction of deflection, relative to the inner end of the lower part of the vane residing forward in the direction of deflection. According to such an arrangement, a movement of gaseous fluid flow directed in the radially outward direction (a straight flow directed radially outward) is restricted, so that the movement of the gypsum powder in the circumferential direction of the vessel is not impeded by such a movement of the gaseous fluid flow. In another preferred embodiment of the present invention, a proximal end portion of the vane supported by the support is superimposed over the proximal end portion of the adjacent vane, as seen in their plan views, so that the vanes adjacent to each other form an overlapping area ($\eta$) of the vanes in the periphery of the support. The overlapping area ($\eta$) prevents or impedes the upward gaseous fluid flow from blowing vertically upward through the vicinity of the support.

In a preferred embodiment of the present invention, the angular interval of the stationary vanes is set to be an angle in a range from 10 degrees to 60 degrees, more preferably, in a range from 20 degrees to 45 degrees, and an uppermost part of each of the stationary vanes is positioned below an upper surface (a design level) of the deposit (fluidized bed) of the gypsum powder accumulated in the reaction region. If the number of the stationary vanes is excessively small, a relatively large load or stress is imposed on each of the vanes. This results in an apprehension that damage, breakage or the like may occur at the proximal end portion of the vane. On the other hand, if the number of the stationary vanes is excessively large, the distance between the adjacent vanes is reduced. This results in an apprehension that adhesion of gypsum onto the stationary vanes may occur. Therefore, the number of the stationary vanes should be set to be a suitable number in consideration of the load or stress on the vanes, adhesion of gypsum onto the vanes, and so forth.

Preferably, the designed level (ha) of the upper surface of the deposit (fluidized bed) is set to be a level in a range from $1.0 \times hb$ to $1.25 \times hb$, wherein "hb" is a designed level of the uppermost part of the stationary vane, and wherein the designed levels "ha", "hb" are dimensions vertically measured from the bottom surface. The upper surface of the fluidized bed behaves irregularly during operation. The designed level of the upper surface of the fluidized bed is a preset level or average level designed or theoretically determined, based on the assumption of a stable or normal operation. That is, the stationary vane may be preferably positioned below the upper surface of the fluidized bed (the designed level), and therefore, the stationary vane may be preferably located, on design, in a height position in which the vane is substantially completely embedded in the fluidized bed.

More preferably, the stationary vane is a curved plate defining the curved fluid path, which deflects the gypsum powder upwardly moving together with the upward gaseous fluid flow, toward the radially outward and circumferential direction. Preferably, an upper edge portion of the vane is curved as seen in its plan view, and is generally inclined downward, while extending toward a direction radially outward of the reaction region, whereas a lower edge portion of the vane is curved as seen in its plan view, while extending substantially horizontally. The diameter (db) of an assembly of the stationary vanes is smaller than a diameter (da) of a circumferential wall of the reaction region, so that the stationary vane is spaced at a predetermined horizontal distance (dc) from the circumferential wall. The diameter (db) of the assembly of the vanes is set to be, preferably, in a range from $0.6 \times$"da" to $0.9 \times$"da", more preferably, in a range from $0.7 \times$"da" to $0.8 \times$"da", wherein "da" is an inner diameter of the circumferential wall of the reaction region.

Preferably, the reactor vessel is provided with a partition wall defining the bottom surface of the reaction region, and a plenum chamber is formed between the partition wall and a bottom wall of the reactor vessel, wherein gas for the upward gaseous fluid flow is supplied to the plenum chamber under pressure. The partition wall has such a gas permeability resistance that the dynamic pressure of the gas supplied to the plenum chamber is converted to the static pressure at least partially. The partition wall also has such a gas permeability that the gas in the plenum chamber is introduced into the reaction region in accordance with the pressure difference between the reaction region and the plenum chamber. It may be understood that the plenum chamber is a buffer zone or a zone for pressure buffering, which is adapted to buffer the supply pressure of the gaseous fluid. Preferably, the plenum chamber is divided into a plurality of plenum chamber sections by partition walls, and each of the plenum chamber sections is provided with a supply device for the upward gaseous fluid flow. The upward gaseous fluid flow is selectively introduced into the reaction region by the plenum chamber section(s). In such an arrangement, it is possible to feed the upward gaseous fluid flow to the reaction region in various patterns. For instance, the stepwisely or cyclically changing upward flow can be generated in the reaction region by delivery of the upward flow from the respective plenum chamber sections with a time lag, whereby the agitating action in the reaction region can be stepwisely or cyclically changed.

In the preferred embodiment of the present invention as described hereinafter, the present invention is applied to a homogenizer. In the homogenizer, air or gas regulated in a predetermined temperature and/or a predetermined humidity, or humid air or gas containing moisture more than a predetermined quantity is introduced into the reaction region as the upward gaseous fluid flow. The calcined gypsum produced by an apparatus for calcination of gypsum or a gypsum calciner is fed to the reaction region as the gypsum power, and the powder of calcined gypsum is agitated by the flow, whereby the dehydration reaction or the hydration reaction of the gypsum dihydrate and/or the anhydrous gypsum contained in the calcined gypsum can progress for a modification treatment or a homogenization treatment of the calcined gypsum.

EXAMPLES

With reference to the attached drawings, a preferred embodiment of the present invention is described hereinafter.

Figure 3:
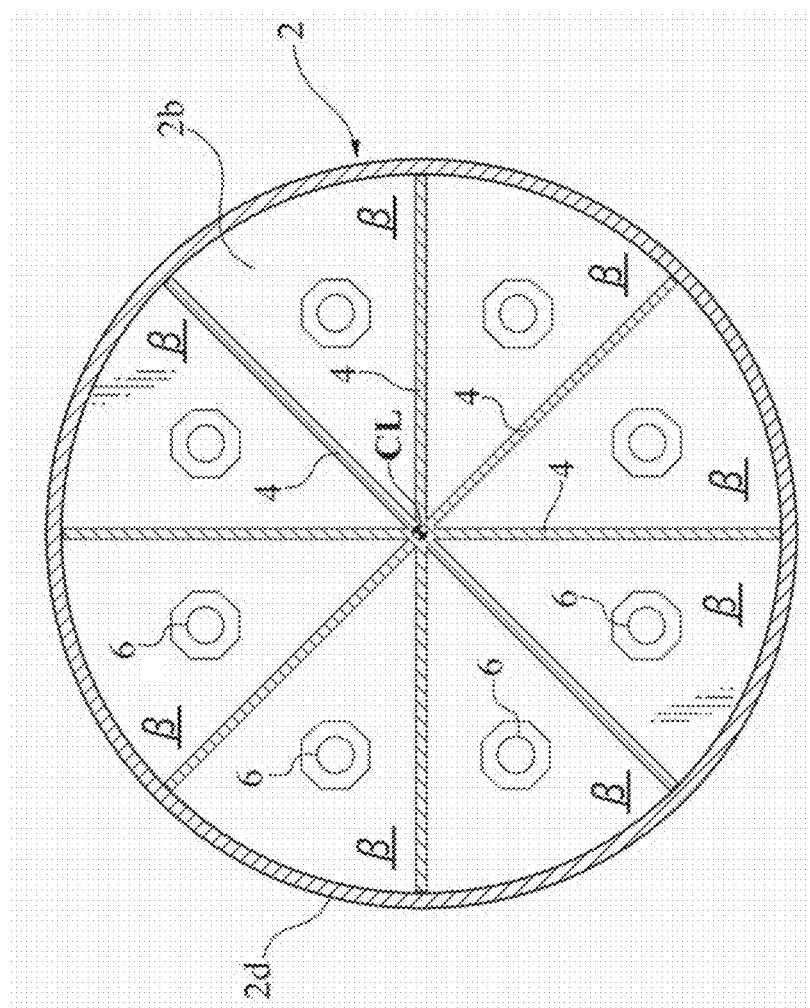
FIG. 3 is a cross-sectional view of the homogenizer taken along a line II-II of FIG. 1.
Figure 4:
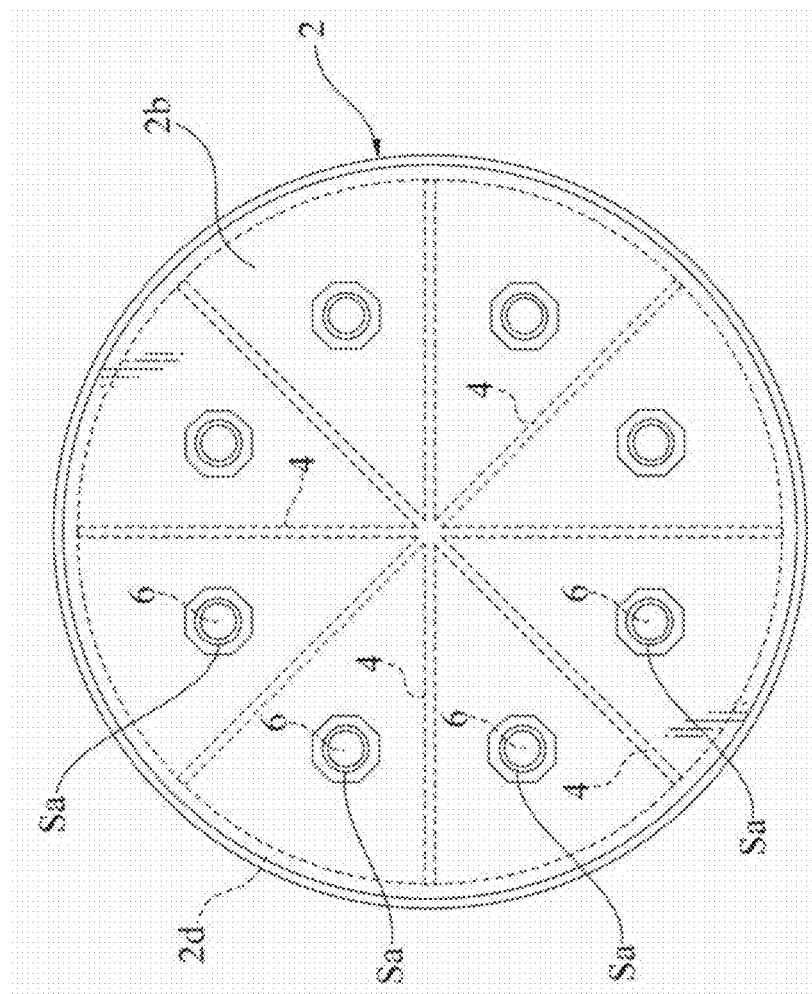
FIG. 4 is a bottom view of the homogenizer as shown in FIG. 1.
Figure 5:
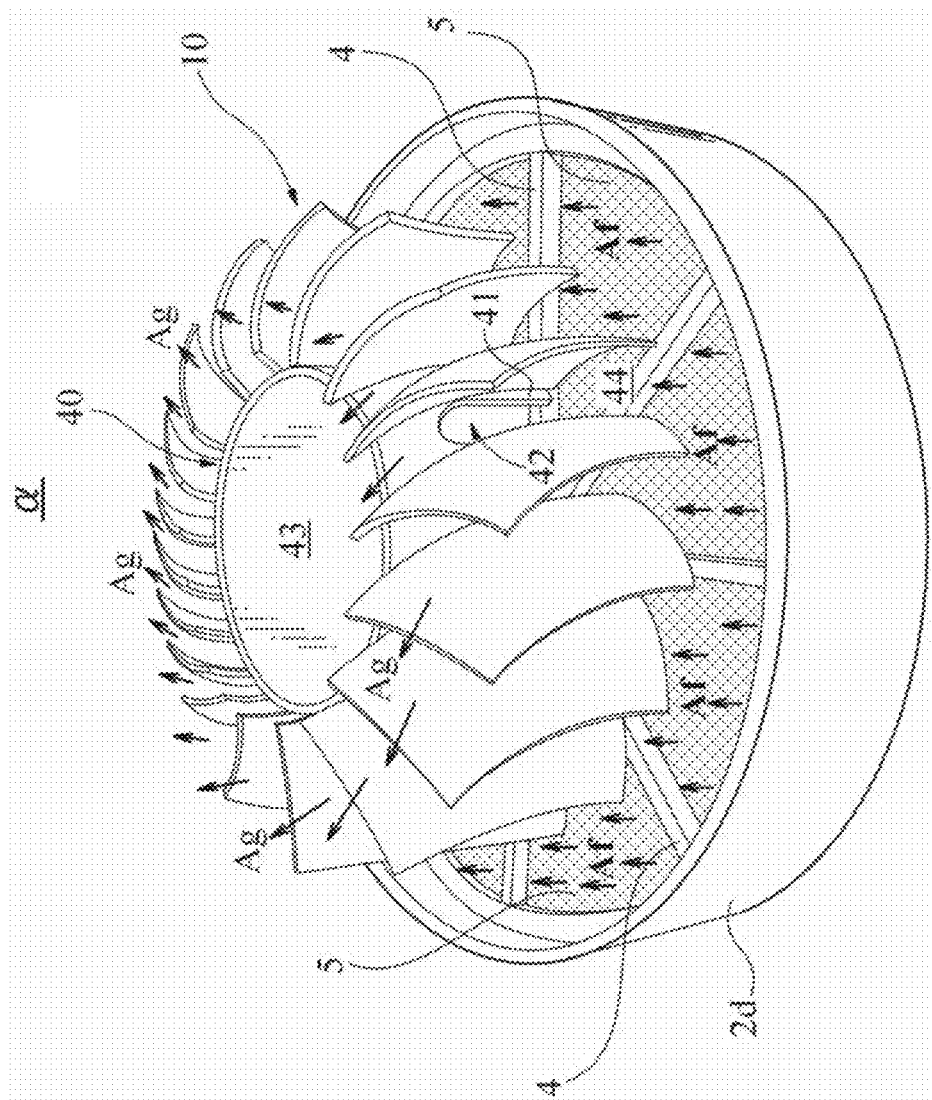
FIG. 5 is a perspective view illustrating a configuration of stationary vanes arranged in a reaction region of the homogenizer.

FIGS. 1 to 4 are a vertical cross-sectional view, cross-sectional views taken along lines I-I and II-II, and a bottom view, each showing a structure of a homogenizer according to the preferred embodiment of the present invention. FIG. 5 is a perspective view illustrating a configuration of stationery vanes arranged in a reaction region of the homogenizer.

The homogenizer 1 has a cylindrical reactor vessel 2, which is provided with an inner wall surface having a circular or annular horizontal cross-section or profile. The inner wall surface of the vessel 2 defines a reaction region α. The vessel 2 comprises a top wall 2a and a bottom wall 2b, each having a circular profile as seen in a plan view, and upper and lower cylindrical circumferential walls 2c, 2d. The top wall 2a is integral with the circumferential wall 2c. The bottom wall 2b is integral with the circumferential wall 2d. The upper and lower circumferential walls 2c, 2d are integral with each other at a joint section 2e. A calcined gypsum inlet port 3 of a gypsum feeder is disposed on the top wall 2a. The port 3 is connected to a gypsum calciner (not shown) through a calcined gypsum supply conduit Sg, so that calcined gypsum Ga of the calciner is charged or introduced through the port 3 into the region α in the vessel 2.

The gypsum calciner is, for example, a conical-kettle-type gypsum calciner for calcining gypsum dihydrate to calcined gypsum. In general, the calciner outputs the calcined gypsum Ga which has been obtained by calcination for converting substantially all of the gypsum dihydrate to gypsum hemihydrate. However, in fact, it is difficult to carry out the calcination for completely converting all of the gypsum dihydrate to the gypsum hemihydrate. Therefore, the calcined gypsum is, normally, an inhomogeneous material in a powder or granular state, which contains gypsum dihydrate as insufficiently calcined gypsum and anhydrous gypsum as excessively calcined gypsum. The structure or arrangement of the gypsum calciner is described in detail in the specification and drawings of Japanese Patent Application No. 2015-35905 (PCT International Application No. PCT/JP2016/054065) which has been filed by this applicant, and therefore, a further detailed explanation thereof is omitted by referring to this application.

Figure 2:
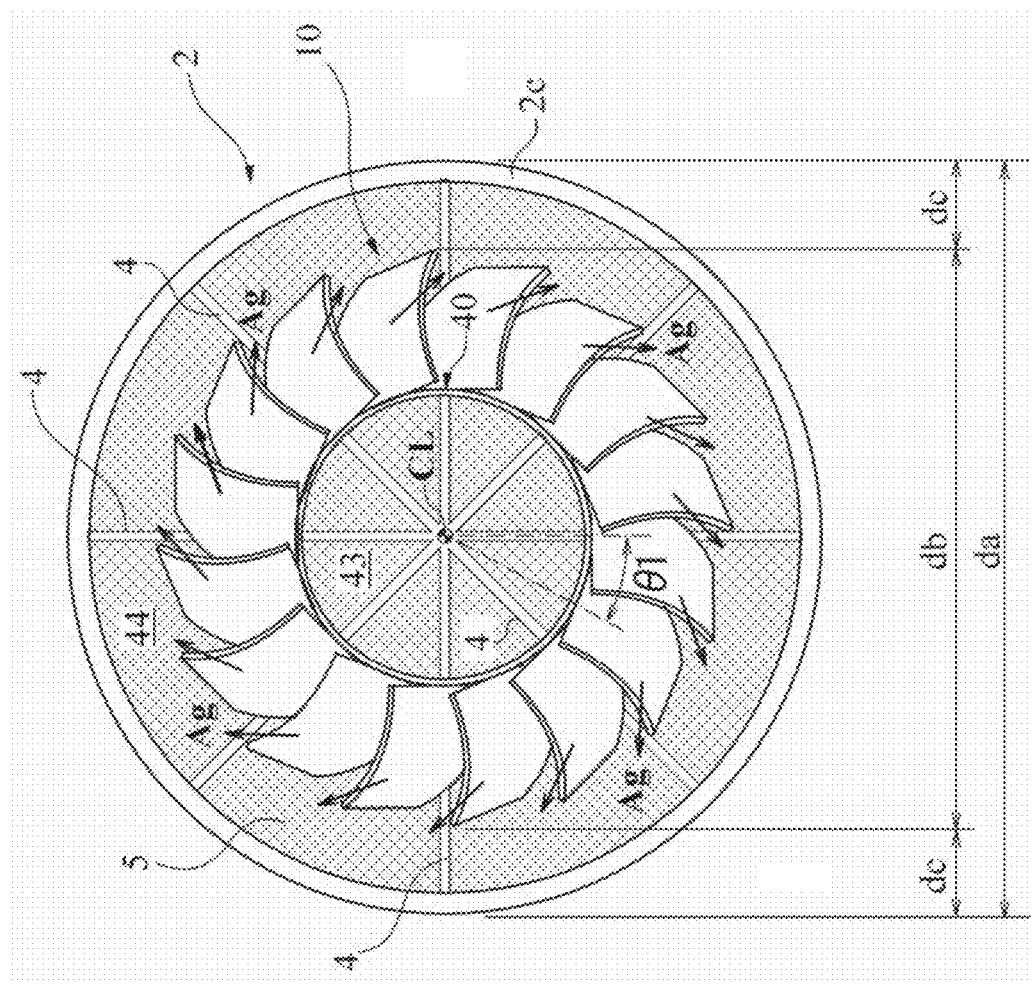
FIG. 2 is a cross-sectional view of the homogenizer taken along a line I-I of FIG. 1.

As shown in FIG. 3, the reactor vessel 2 has vertical partition walls 4 fixed onto the bottom wall 2b. The walls 4 radially extend from a center axis CL of the vessel 2 to the circumferential wall 2d, as seen in the plan view. In this embodiment, the walls 4 are arranged at angular intervals of 45 degrees about the center axis CL. As shown in FIGS. 1, 2 and 5, the vessel 2 has a horizontal air-permeable partition wall 5 which defines a bottom surface of the reaction region α. The wall 5 is supported by an upper end portion of each of the walls 4. The walls 4, 5 define a plurality of plenum chambers or buffer zones for supply air β (referred to as "plenum chambers β" hereinafter) between the region α and the bottom wall 2b. Preferably, the walls 4 are so arranged as to form the four to sixteen plenum chambers β.

In this embodiment, the eight plenum chambers β, each being formed in a sector shape as seen in its plan view, are uniformly arranged around the center axis CL. Air supply ports 6, each opening to each of the plenum chambers β, are provided on the bottom wall 2b. As shown in FIGS. 1 and 4, conditioned air supply conduits Sa of a gaseous fluid flow supply device are connected to the ports 6, respectively. The conduits Sa are connected to a conditioned air supply source (not shown), which includes an air heating device, such as a heating coil, an air supply device, such as an air blower or fan, and so forth. Humid air including a relatively large amount of moisture is delivered to the conduits Sa, as conditioned air flows Ai, by the conditioned air supply source. The conditioned air of the flow Ai is a gas for generating the upward gaseous fluid flow as set forth above (a conditioned air flow Af as described later). The flow Ai delivered by the conditioned air supply source is supplied to each of the plenum chambers β under pressure by each of the ports 6. The temperature of the conditioned air delivered through the port 6 differs, depending on the humidity of the conditioned air, but the temperature of the conditioned air is preferably set to be such a temperature that dew condensation does not occur in the reactor vessel 2. Instead of the conditioned air, a high-temperature humid gas may be used, which is generated in a gypsum calcination apparatus for producing calcined gypsum and separated from the calcined gypsum. Such a high-temperature humid gas has a temperature, for example, in a range from 100 degrees C. to 150 degrees C.

The partition wall 5 is a composite material in a form of a sheet or plate which comprises a substrate 50 covered with upper and lower covering materials 51, 52. The substrate 50 and the covering materials 51, 52 have such air permeability resistances that the dynamic pressure of the gaseous fluid-supply flow (the conditioned air flow Ai) is converted to the static pressure at least partially and that the air in the chamber β flows therethrough into the reaction region α in accordance with the pressure difference between the region α and the chamber β. Therefore, as shown in FIGS. 1 and 5, the wall 5 allows the gaseous fluid-supply flow (the conditioned air flow Af) to be introduced through an overall area of the wall 5 into the region α uniformly, depending on the difference in pressure between the chamber 13 and the region α.

A fiber material, such as a fiber aggregate, a nonwoven fabric or a felt material, may be preferably used as the substrate 50. Preferably, a heat-resistant nonwoven fabric, such as a glass fiber nonwoven fabric, may be used as the substrate 50. Further, a woven fabric, a punching metal, a mesh material or the like may be preferably used as the covering material 51, 52. The thickness t of the wall 5 is set to be in a range from 5 mm to 10 mm (for example, 6 mm). A pressure loss of the wall 5 is set to be, preferably, in a range from 200 mmH$_2$O to 500 mmH$_2$O.

The flow Af is introduced through the partition wall 5 into the reaction region α as the aforementioned upward gaseous fluid flow, so as to agitate the calcined gypsum Gb. It is desirable that a fluid current of the flow Af is so strong as to make a saltational fluid motion of the gypsum Gb accumulated in the reaction region α. Preferably, a current velocity of the flow Af is so set as to ensure such a fluid current strength. Desirably, the current velocity of the flow Af introduced into the region α is set to be in a range from 0.05 m/s to 1.0 m/s.

As shown in FIG. 1, the calcined gypsum Ga is fed to the calcined gypsum inlet port 3 by the calcined gypsum supply conduit Sg. The gypsum Ga is successively (or intermittently) charged or introduced into the reaction region α through the port 3, so that the gypsum Ga is accumulated on the horizontal partition wall 5 as a fluidized bed M of the calcined gypsum Gb (calcined gypsum bed). A calcined gypsum outlet port 7 is disposed in a lower portion of the circumferential wall 2c of the reactor vessel 2. The calcined gypsum Gc, which has been homogenized by an agitating action, a heat exchange action and a moisture-incorporating action in the region α, is discharged through the port 7 to the outside. The port 7 is provided with a fixed-quantity-type of powder feeder 8, such as a weight-control-type rotary feeder. The device 8 successively (or intermittently) discharges the calcined gypsum Gc from the region α to the outside of the device or the system. Then, the gypsum Gc is fed to a succeeding device (a water adding device, a cooling device, a milling device, and so forth), or a storage device, such as a silo. Depiction of conduits and equipments associated with the succeeding device is omitted from FIG. 1. Also, depiction of conduits, wiring, equipments and so forth constituting a gas exhaust system and a control system of the homogenizer 1 is also omitted from FIG. 1.

The gaseous fluid flow (the conditioned air flow) Af, Ag, which flows out from the partitioned wall 5, causes the calcined gypsum Gb of the fluidized bed (calcined gypsum bed) M to make a fluid motion accompanied with saltation, whereby the gypsum Gb is agitated in the region α. The homogenizer 1 is provided with a number of stationary vanes (guide vanes) 10, which are circumferentially spaced apart from each other and arranged regularly in a lower part of the region α. The vanes 10 promotes the saltational fluid motion of the gypsum Gb, whereby an upper space of the fluidized bed M acts as a saltational fluid motion area γ for the calcined gypsum. In addition, the vanes 10 also causes the gypsum Gb to make a saltational movement in a circumferential direction of the region α. The flow Ag is a deflected flow of the flow Af which is deflected by the vanes 10. The saltational fluid motion is a fluid motion in a condition or mode in that an upper surface of the fluidized bed M makes a dynamic fluid motion and powders of the gypsum Gb jump or leap into the upper space (the saltational fluid motion area γ) and fall down therefrom.

As shown in FIGS. 1, 2 and 5, a cylindrical hollow post 40, which functions as a support for the vanes 10, is erected on the bottom surface of the region α in a center area of the region α. The post 40 supports the vanes 10. The vanes 10 are spaced at an equal interval and are fixed to an outer circumferential surface of the post 40, respectively. Therefore, proximal end portions of the vanes 10 are positioned in the center area of the region α. A cross-section of the post 40 is a true circle centered at the center axis CL. An upper end of the post 40 is positioned below an upper surface Ma (a level ha) of the fluidized bed M. A lower part of the post 40 comprises columnar bases 41 spaced at an equal interval (an angular interval of 45 degrees) and supported by the partition walls 4; and openings 42 formed between the bases 41. An internal area 43 of the post 40 and an external area 44 thereof are in communication with each other by the openings 42 so that the gypsum Gb can be prevented from partially staying in the internal area 43 for a long time.

Figure 6:
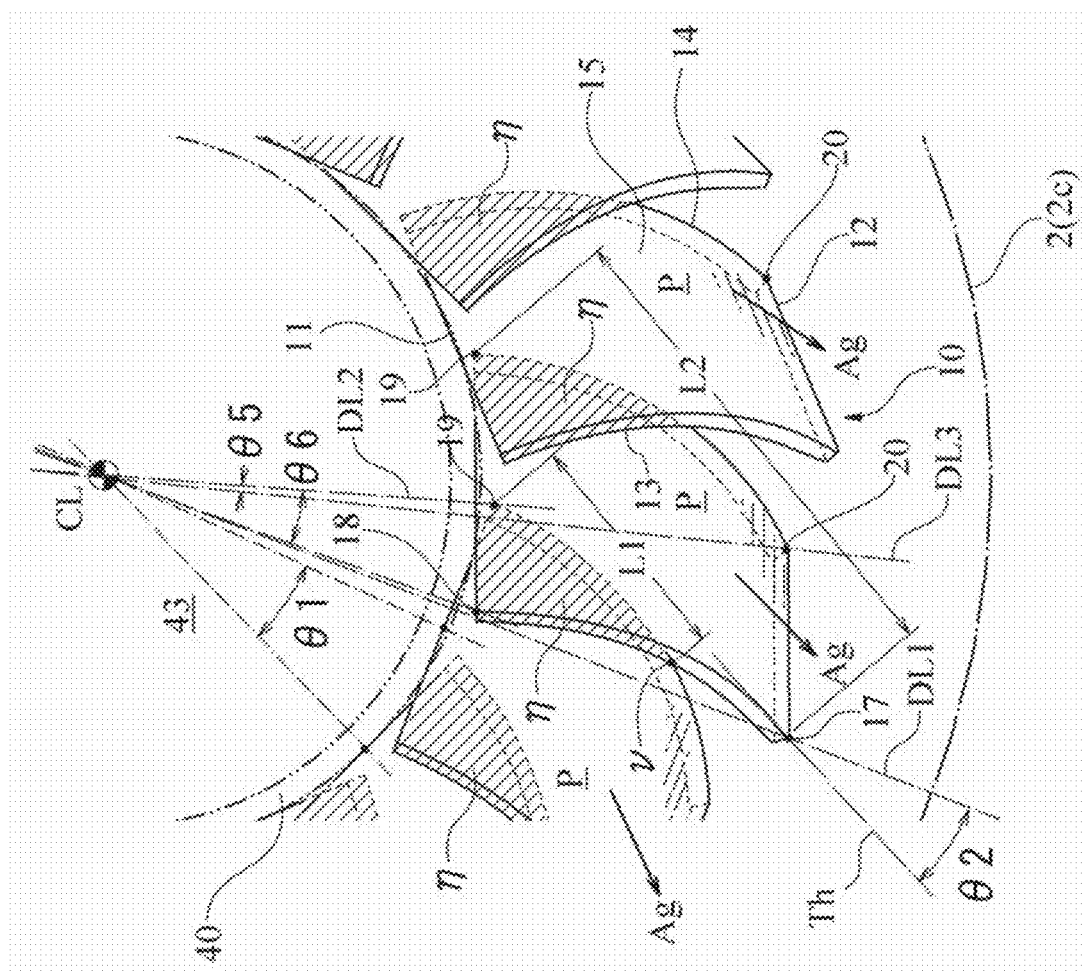
FIG. 6 is a partially enlarged plan view showing the structure of each of the vanes.
Figure 7:
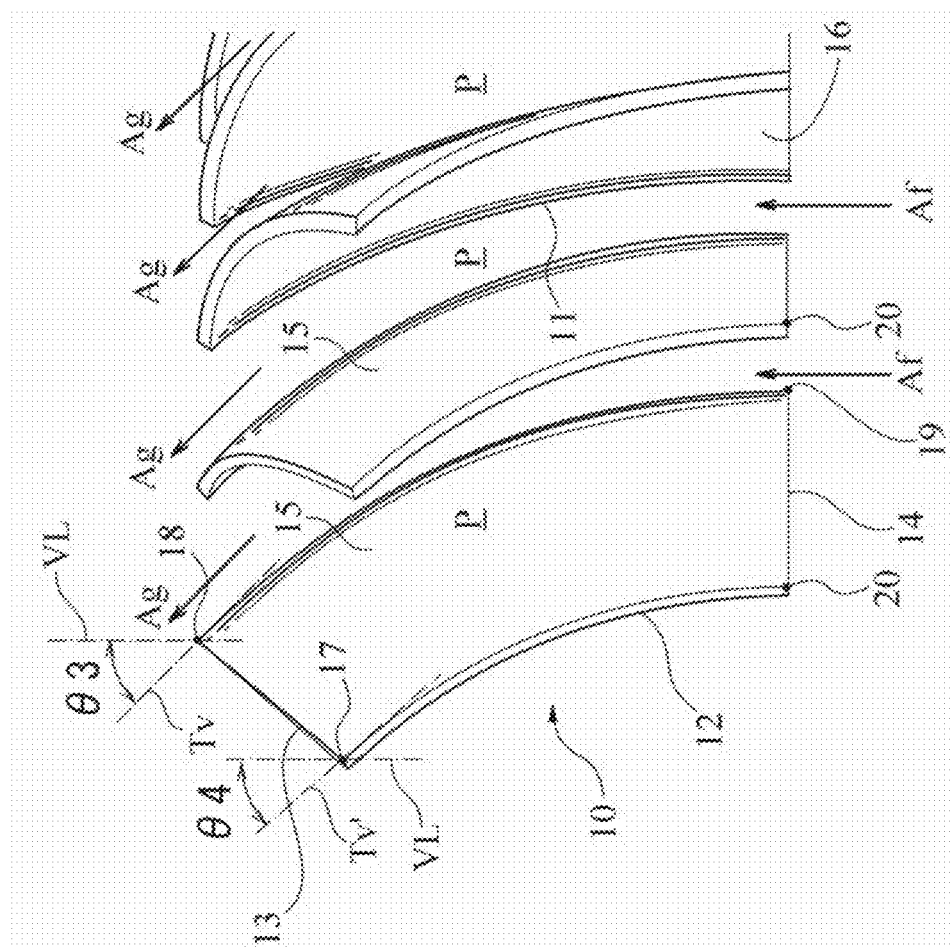
FIG. 7 is a partially enlarged elevational view showing the structure of each of the vanes.

As shown in FIGS. 1 and 5, the vanes 10 are positioned under the upper surface Ma in an outer peripheral zone of the post 40. An uppermost portion of the vane 10 (an upper/inner end 18 of the vane 10 as shown in FIGS. 6 and 7) is positioned at a level hb (a position of the height hb measured from the upper surface of the partition wall 5). Assuming that the level ha as shown in FIG. 1 is a preset level or a designed level of the upper surface Ma, the level ha may be preferably set to be in a range from 1.0×hb to 1.25×hb. That is, the vanes 10 may be preferably positioned at a level at which the vanes 10 are substantially fully embedded in the fluidized bed M. However, during operation of the homogenizer 1, behavior of the upper surface Ma of the fluidized bed M is relatively violent. A phenomenon including undulations, risings, sinkings and the like occurs on the upper surface Ma, repeatedly in a short term of time. Therefore, a condition that the vane is merely partially embedded in the bed M (i.e., a condition that an upper part of the vane 10 is exposed to the upper space above the upper surface Ma) is observed in operation of the homogenizer 1. Thus, it should be understood that the positional relation between the levels ha, hb as set forth above is the positional relation in a design condition or an initial setting condition. Further, the lower edges 14 (FIG. 7) of the vanes 10 are vertically spaced apart from the wall 5, and the height hc of the vane 10 is set to be a dimension, preferably, in a range from 0.2×ha to 0.6×ha, more preferably, in a range from 0.2×ha to 0.4×ha.

As illustrated in FIGS. 1 and 2, a diameter db of the assembly of the vanes 10 with respect to the center axis CL is smaller than an inner diameter da of the circumferential wall 2c at the same level. The vane 10 and the wall 2c are spaced apart at a horizontal distance dc from each other. With respect to the diameter da, the diameter db is set to be, preferably, in a range between 0.6×da and 0.9×da, more preferably, in a range between 0.7×da and 0.8×da. Therefore, the horizontal distance dc is set to be, preferably, in a range between 0.2×da and 0.05×da, more preferably, in a range between 0.15×da and 0.1×da. According to such a setting of the distance dc, it is possible to effectively augment the circumferentially directed movement of the calcined gypsum Gb residing in the vicinity of the inner wall surface of the reactor vessel 2, or effectively energize the gypsum Gb in the circumferential direction of the vessel 2.

As shown in FIG. 2, the vanes 10 are arranged circumferentially and spaced from each other at a uniform angular interval θ1 about a center axis CL of the reactor vessel 2. The angular interval θ1 is set to be, preferably, an angle ranging from 10 degrees to 60 degrees, more preferably, an angle ranging from 20 degrees to 45 degrees (22.5 degrees in this embodiment). The number of vanes 10 is set to be, preferably, in a range from six to thirty six, more preferably, in a range from eight to eighteen (sixteen in this embodiment). For example, in a case of the fluidized bed having a diameter of approximately 3 m, the number of the vanes 10 is preferably set to be in a range from eight to sixteen. The angular interval of the vanes 10 is not inevitably set to be a uniform angle throughout the overall circumference, but the angular interval may be set to be an arbitrary angle in correspondence to the structures of the vessel 2, the post 40 and so forth.

Figure 8:
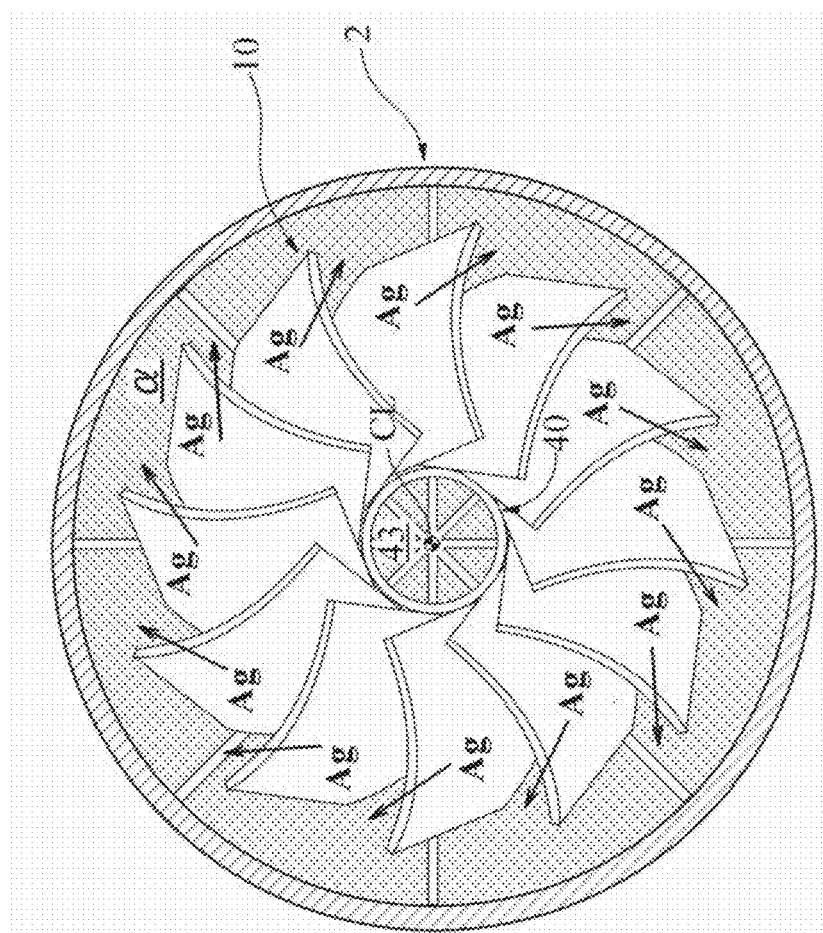
FIG. 8 is a horizontal cross-sectional view of the homogenizer in which an alternative configuration of the vanes is illustrated.

FIG. 8 is a horizontal cross-sectional view of the reactor vessel 2 which has been changed in the diameter of the post 40, the number of the vanes 10, the interval of the vanes 10, and so forth.

The post 40 as shown in FIG. 2 has a diameter which is approximately one-third of the inner diameter da. However, if the diameter of the post 40 is reduced as illustrated in FIG. 8, the proximal end portion (basal portion) of the stationary vane 10 is in position closer to the center of the region α, and therefore, the agitation can be effected even in a zone close to the center of the region α. Thus, it is considered that the proximal end portion (basal portion) of the vane 10 may be preferably located in a position closer to the center of the region α, so far as such a location is permissible from a viewpoint of the arrangement and structure of the vanes 10.

FIGS. 6 and 7 are a partially enlarged plan and elevational views showing the structure of each of the vanes 10.

As illustrated in FIGS. 6 and 7, each of the stationary vanes 10 is made of a curved metallic plate having a curved inner edge 11, a curved outer edge 12, a curved upper edge 13 and a curved lower edge 14. The proximal end portion of the vane 10 including the edge 11 is fixed to the post 40 by a mounting device, such as brackets and bolts (not shown), or a jointing method, such as welding. The vane 10 forms a surface substantially continuous with the outer surface of the post 40. Each of the edges 11, 12, 13, 14 is curved in a predetermined radius of curvature. Each of the vanes 10 forms a convex curved surface 15 faced obliquely upward and a concave curved surface 16 faced obliquely downward. The upper edge 13 inclines downward while extending outward. The lower edge 14 extends substantially horizontally.

A fluid path P is defined between the adjacent vanes 10. As seen in its plan view, the path P extends in a circumferential and radially outward direction of the post 40, while curving. The path P opens toward a peripheral zone in the vicinity of the circumferential wall 2c, and extends upward in a form of a curved fluid passage generally inclined relative to the vertical direction. As described later, the path P deflects an upward current of the conditioned air flow Af, Ag toward a radially outward and circumferential direction.

In FIG. 6, a line segment DL1 extending in a diametric direction of the post 40 (as seen in its plan view) is depicted by a one dot chain line, wherein the segment DL1 passes through the center axis CL and an upper/outer end 17. If each of the vanes 10 straightly extends in the radial direction of the reactor vessel 2, the calcined gypsum Gb making a saltational fluid movement in the peripheral zone of the fluidized bed M would impinge against the wall 2c so as to reduce a distance of saltation, and therefore, the agitation effect cannot be obtained sufficiently. For such a reason, a tangential line Th (in a horizontal plane) of the vane 10 at the end 17 is oriented in a direction of an angle θ2 relative to the segment DL1, as shown in FIG. 6. Further, tangential lines Tv, Tv' (in a vertical plane) of the vane 10 at an upper/inner end 18 and the upper/outer end 17 are oriented in directions of angles θ3, θ4 relative to the vertical direction VL. The angle θ2 is set to be, preferably, in a range from 10 degrees to 60 degrees, more preferably, in a range from 15 degrees to 45 degrees. The angles θ3, θ4 are set to be, preferably, in a range from 10 degrees to 60 degrees, more preferably, in a range from 15 degrees to 45 degrees. The angles θ3, θ4 are relatively important angles for desirably causing a saltational movement or saltational swirling motion of the gypsum Ga in the circumferential direction. Therefore, if the relatively small number of vanes are provided, it is desirable that each of the angles θ3, θ4 is set to be a relatively large value.

As shown in FIG. 6, the adjacent vanes 10 are positioned in such a manner that their proximal end portions are overlapped with each other and their distal end portions are spaced apart from each other, as seen in their plan views. The lower/inner end 19 and the lower/outer end 20 of the vane 10 are illustrated in FIG. 6. Further, line segments DL2, DL3 extending in a diametric direction of the post 40 (as seen in the plan view) are depicted by one dot chain lines, in FIG. 6. The segment DL2 passes through the center axis CL and the end 19 of the vane 10 positioned forward in a direction of deflection of the conditioned air flow Ag (a clockwise direction as seen in the plan view). The segment DL3 passes through the center axis CL and the end 20 of the vane 10 positioned backward in the direction of deflection of the flow Ag. Further, overlapping areas η of the vanes 10 (as seen in the plan view) are provided around the support, as indicated by hatching in FIG. 6. The area η prevents the flow Ag from blowing through the outer periphery of the post 40 vertically upward.

The end 20 of the backward vane 10 is located in a position shifted forward, relative to the end 19 of the forward vane 10. The ends 19, 20 are spaced at an angular interval of a central angle θ5 around the center axis CL. That is, an angular position of the end 20 of the backward vane 10 has a phase difference of the advanced angle θ5 around the center axis CL, with respect to the angular position of the end 19 of the forward vane 10. The angle θ5 is larger than zero degrees, and it is set to be, preferably, equal to or less than 0.3×θ1, more preferably, equal to or less than 0.2×θ1, with respect to the angular interval θ1 of the vanes 10. According to such an arrangement of the vanes 10, it is possible to restrict the radially outward movement of the gaseous fluid flow which may impede the movement of the gypsum powder in the circumferential direction of the reactor vessel.

Since the overlapping area $1_1$ of the vanes 10 is ensured as set forth above, the upward blowing motion of the flow Ag is effectively impeded in the vicinity of the outer peripheral surface of the post 40, and therefore, the upward current of the conditioned air flow Ag passing the fluid path P can be certainly deflected by the vanes 10. Thus, the phase difference (the angle θ5) and the overlapping area η as set forth above promote an agitating action of the flow Ag. This contributes to homogenization of the gypsum Gb. The overlapping area η may be preferably set to be an area in which an angle θ6 is larger than zero degrees; θ6 is smaller than θ1; L1/L2 is equal to or less than ½; and L1/L2 is equal to or greater than ¼, wherein the angle θ6 is an angle between the end 18 of the certain vane 10 and the end 19 of its adjacent vane 10, "L1" is a distance between a radially outward end v of the area η and the end 19 (as seen in the plan view), and "L2" is a length of the vane 10 measured in its diagonal direction as seen in the plan view (that is, the maximum length of the vane 10 in the plan view).

As shown by the arrows in FIGS. 1, 2 and 5 to 7, the vane 10 guides the conditioned air flow Ag, which moves upward in the fluid path P, toward a radially outward and circumferential direction, so that fluidized matters (the calcined gypsum Gb) of the gypsum bed M fluidized by the flow Ag are directed toward the radially outward and circumferential direction, together with the flow Ag. The flow Ag and the calcined gypsum Gb in the path P move out from the path P substantially in a tangential direction of the post 40 from the vicinity of the upper and outer edges 12, 13 and move into the peripheral zone. The vane 10 is generally curved and the edge 13 of the vane 10 is inclined downward while extending outward, and therefore, an upper corner part of the vane 10 does not interfere with such movements of the flow Ag and the calcined gypsum Gb. The flow Ag and the calcined gypsum Gb directed toward the circumferential direction energize the calcined gypsum Gb in the peripheral zone toward the circumferential direction, or augment the movement of the calcined gypsum Gb toward the circumferential direction in the peripheral zone.

The operation of the homogenizer 1 with the aforementioned arrangement is explained hereinbelow.

In use of the homogenizer 1 as shown in FIG. 1, the calcined gypsum Ga of the gypsum calciner is successively (or intermittently) fed to the reaction region α through the conduit Sg and the port 3. The gypsum Ga is accumulated in the lower part of the region α as the fluidized bed M. The conditioned air Ai is supplied to the plenum chamber β from the conditioned air supply source through the port 6 under pressure. The air Ai may be delivered to the chamber 13 though all of the ports 6 simultaneously; or otherwise, the air Ai may be stepwisely or cyclically delivered to the chamber β by stepwisely or cyclically operating the ports 6.

Figure 9:
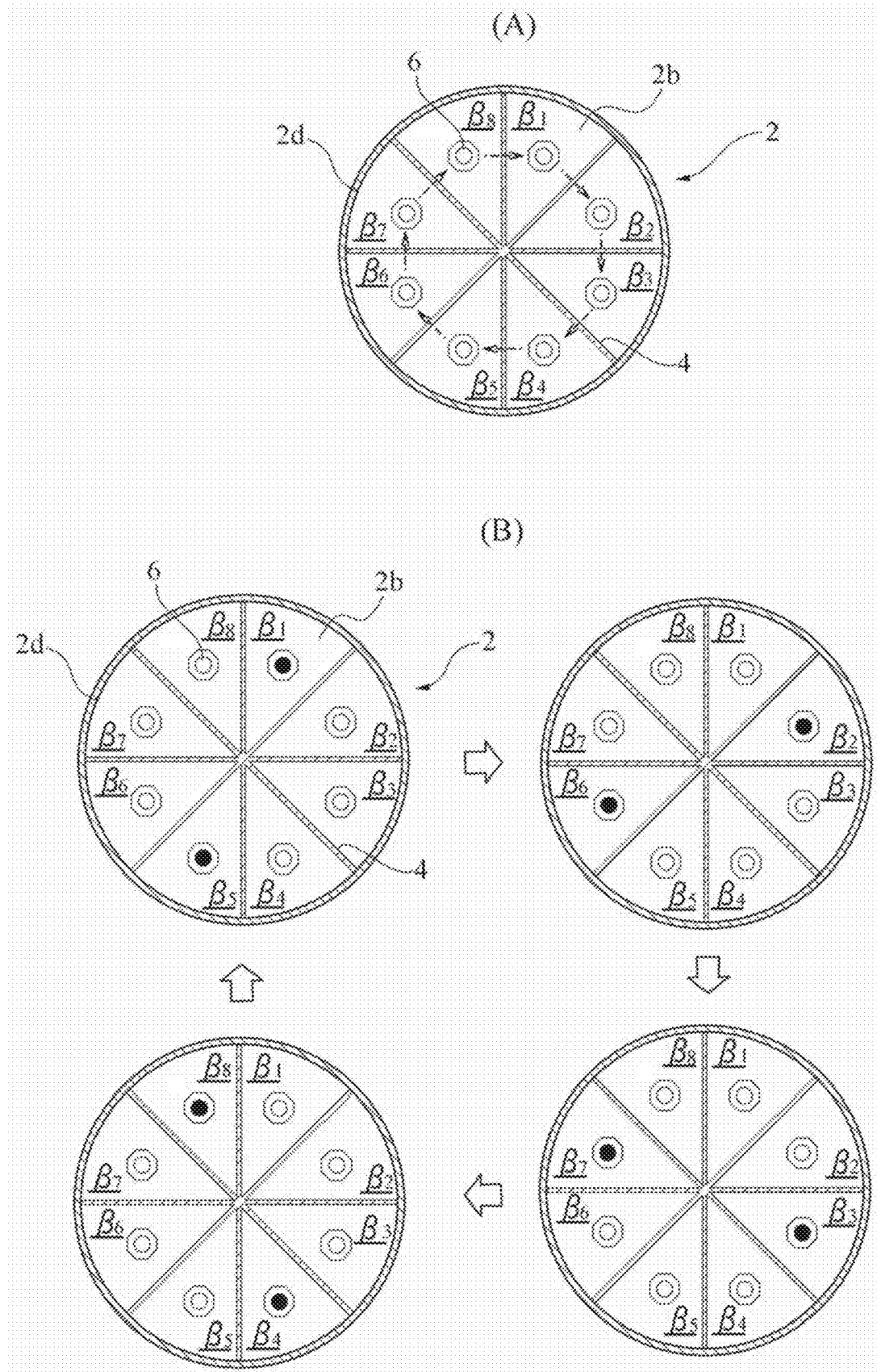
FIG. 9 is a set of plan views of a plenum chamber which conceptionally illustrates a mode of operation (an example of a way of operation) of supply air ports, each provided at each of plenum chamber sections.

In FIG. 9(A), the plenum chambers β1 to β8 are depicted. For example, the ports 6 can be so operated as to deliver the air Ai sequentially to the chambers β1 to 138 with a time lag. In FIG. 9 (B), the port 6 in operation (delivery of the conditioned air) is indicated by a black circle, whereas the port 6 in an inoperative condition (cessation of delivery of the conditioned air) is indicated by a white circle. As illustrated in FIG. 9 (B), the ports 6 located on the opposite sides in a diagonal direction may be operated simultaneously and this configuration may be shifted in a clockwise direction, whereby the air Ai may be stepwisely or cyclically supplied to the chambers β1 to β8. It can be easily understood that the pattern of operation of the ports 6 may be arbitrarily set, in relation to the condition of use of the homogenizer 1, operation of the homogenizer 1, or the like.

The air pressure of the chamber β, which is supplied with the air Ai, is increased. As shown in FIG. 1, the partition wall 5 upwardly ejects the air flow Af in response to increase in the internal pressure of the chamber β. The air flow Af enters into the region α to be the conditioned air flow Ag deflected in an obliquely upward, radially outward and circumferential direction.

The air flow Ag causes most of the calcined gypsum Gb to take a saltational fluid action directed in the radially outward and circumferential direction in an upper part of the fluidized bed M. The gypsum Gb making a saltational fluid motion in the radially outward and circumferential direction energizes the gypsum Gb in the peripheral zone of the bed M toward the circumferential direction so as to induce or augment the motion of the gypsum Gb in the peripheral zone toward the circumferential direction. That is, the saltational fluid motion of the gypsum Gb directed in the radially outward and circumferential direction is caused in the fluidized bed M, due to an passively deflecting action of the stationary vane 10. The air of the flow Ag spouting upward to the upper space from the upper surface Ma of the bed M is expelled from the region α by an exhaust gas conduit (not shown) connected to the top wall 2a of the reactor vessel 2 or the like, and then, exhausted out of the system through an exhaust gas treatment facility (not shown) for the homogenizer 1.

Such a saltational fluid motion of the calcined gypsum Gb promotes the fluidization and agitation of the gypsum Gb, so that heat exchange takes place between the excessively calcined gypsum and insufficiently calcined gypsum contained in the calcined gypsum Gb (that is, the gypsum dihydrate and the anhydrous gypsum), whereby the gypsum dihydrate and the anhydrous gypsum are converted to the gypsum hemihydrate by a dehydration reaction and a hydration reaction. In addition, since the gypsum hemihydrate is brought into contact with the humid air flow Ag, an effect of incorporating moisture into the calcined gypsum can be obtained by the moisture contained in the air flow Ag. As the result, the ratio of the gypsum dihydrate and the anhydrous gypsum included in the calcined gypsum Ga is reduced and the proportion of the gypsum hemihydrate in the gypsum Ga is increased. Therefore, the gypsum Ga is homogenized to be the gypsum hemihydrate with little "uneven calcination".

The gypsum Ga thus homogenized is successively (or intermittently) discharged through the calcined gypsum outlet port 7 and the fixed-quantity-type powder feeder 8 out of the equipment or out of the system, as the relatively high-purity calcined gypsum Gc with the reduced contents of the excessively calcined gypsum and the insufficiently calcined gypsum. As described previously, the gypsum Gc discharged through the device 8 is fed to the succeeding device (a water adding device, a cooling device, a milling device, and so forth), or a storage device, such as a silo.

Although the present invention has been described as to a preferred embodiment, the present invention is not limited thereto, but may be carried out in any of various changes or variations without departing from the scope of the invention as defined in the accompanying claims.

For instance, the aforementioned embodiment relates to the homogenizer for homogenizing the calcined gypsum, but the present invention may be generally applicable to treatment of gypsum, which is exemplified as follows:

(1) a modification of calcined gypsum improving the fluidity of slurry in a step of slurrying the calcined gypsum, with use of a reactor having a water sprinkling device or the like which adds water to the calcined gypsum for adjustment of a water content of the calcined gypsum or incorporation of moisture into the calcined gypsum;

(2) an aging treatment for stabilizing or deactivating the calcined gypsum in which the gypsum is forcibly subjected to exposure to atmospheric air;

(3) a mixing and agitating treatment for adding an additive (for example, insolubilizing agent or polymer flocculating agent for a soil treatment, and so forth) to the calcined gypsum and so forth; and (4) a calcination treatment for calcining the gypsum dihydrate so as to convert the gypsum dihydrate to the gypsum hemihydrate, by agitating the gypsum dihydrate with use of high temperature gas.

Further, the homogenizer according to the aforementioned embodiment is intended to homogenize or modify the calcined gypsum by incorporating the moisture into the calcined gypsum, in order to bring the calcined gypsum into a less "uneven calcination" condition and improve the fluidity of the slurry in a slurrying step. Therefore, the homogenizer uses the humid air as the upward flow. However, air or gas, which has been prepared to have a predetermined temperature or a predetermined humidity in accordance with the purpose of the treatment of gypsum; or humid air or humid gas, which includes moisture equal to or more than a predetermined moisture content in accordance with the purpose of the treatment of gypsum, may be used as the upward flow.

Moreover, in the aforementioned embodiment, the positional relation between the upper surface of the fluidized bed and the vane is so set as to fall under a range between ha=1.0×hb and ha=1.25×hb, but the designed level ha may be, if desired, lower than the level hb.

Furthermore, the proximal end portion of the vane may be attached to the post by a position adjustment device for adjusting the positional relation between the vane and the post, in such a manner that the position of the vane is adjustable. In the aforementioned embodiment, the vane forms a face substantially continuous with the outer surface of the post. However, if desired, a gap or clearance may be provided between the proximal end portion of the vane and the outer surface of the post.

In addition, the homogenizer according to the aforementioned embodiment is described to be a continuous processing type of gypsum treatment apparatus which is adapted to continuously or intermittently charge or feed the gypsum power into the reaction region and continuously or intermittently output the gypsum power after treatment from the reaction region to the outside of the system or apparatus. However, the apparatus of the present invention is not limited to the design of the continuous processing type of apparatus, but the apparatus of the present invention may be designed to be a so-called batch processing type of apparatus, in which a certain quantity or a specific quantity of gypsum powder is processed in the reaction region and discharged therefrom, and then, a certain quantity or a specific quantity of gypsum powder is charged or fed to the reaction region and processed therein again.

INDUSTRIAL APPLICABILITY

The present invention is applicable to a fluidized-bed-type reactor for homogenization, modification, calcination, mixing, or moisture content adjustment of the gypsum material or its raw material, or the like. Also, the present invention is applicable to a process of homogenization, modification, calcination, mixing, or moisture content adjustment of the gypsum material or its raw material, or the like, with use of the fluidized-bed-type reactor. In particular, the present invention is preferably applied to a homogenizer and a method for homogenizing the calcined gypsum, in which the gypsum dihydrate and the anhydrous gypsum contained in the calcined gypsum extracted from a gypsum calcination apparatus is converted to the gypsum hemihydrate so that the calcined gypsum is homogenized to be the calcined gypsum substantially consisting of the gypsum hemihydrate. According to the present invention, a fluidized-bed-type calcined gypsum treatment apparatus and method, in which the calcined gypsum is accumulated on a bottom part of a reaction region and conditioned air flow is spouted from the bottom part, can improve the fluidity of the calcined gypsum so as to promote the dehydration reaction or the hydration reaction of the gypsum dihydrate and/or the anhydrous gypsum contained in the calcined gypsum, thereby effectively homogenizing the calcined gypsum. Thus, the practical advantage of the present invention is remarkable.

REFERENCE SIGNS LIST

1: homogenizer
2: cylindrical reactor vessel
2a: top wall
2b: bottom wall
2c, 2d: circumferential wall
3: calcined gypsum inlet port
4: vertical partition wall
5: horizontal partition wall
6: air supply port
7: calcined gypsum outlet port
8: fixed-quantity-type gypsum powder feeder
10: stationary vane
40: post
α: reaction region
β: plenum chamber
η: overlapping area
Ai, Af, Ag: conditioned air flow (or conditioned air)
Ga, Gb, Gc: calcined gypsum
M: fluidized bed
Ma: upper surface of fluidized bed
P: fluid path
  Sa: conditioned air supply conduit

The invention claimed is:

1. A gypsum treating apparatus including a reactor vessel, an inlet port for gypsum powder and a gaseous fluid flow supply port, the reactor vessel having an inner wall surface with a circular or annular horizontal cross-section or configuration, said inlet port being configured to feed gypsum powder into a reaction region in the reactor vessel, and said gaseous fluid flow supply port being positioned in a bottom part of the reaction region and configured to provide an upward gaseous fluid flow in the reaction region to agitate the gypsum powder accumulated in the bottom part of the reaction region; comprising:
  a plurality of stationary vanes extending toward said inner wall surface from a support which is positioned in a center area of the reaction region,
  wherein the vanes are spaced from each other at an angular interval in a circumferential direction of said reaction region and the vanes are spaced apart at a horizontal distance from said inner wall surface to produce a circumferentially directed movement of the gypsum powder in a vicinity of the inner wall surface;
  wherein said vanes are positioned at a level at which the vanes are at least partially embedded in the gypsum powder accumulated in the reaction region, the adjacent vanes being configured to form a fluid path therebetween into which said flow spouted from a bottom surface of the reaction region is introduced and in which the gypsum powder is fluidized by the flow, and the fluid path being inclined to deflect said flow toward a radially outward and circumferential direction of said reaction region; and
  wherein a lower edge portion of said vane is curved as seen in its plan view, and an outer end portion of the lower edge portion is spaced at a predetermined horizontal distance (dc) from a circumferential wall of said reactor vessel defining said inner wall surface, and the horizontal distance (dc) is set to be in a range from 0.2× a diameter (da) to 0.05× the diameter (da), wherein the diameter (da) is an inner diameter of said circumferential wall.

2. The apparatus as defined in claim 1, wherein said vanes adjacent to each other define said fluid path which opens toward a peripheral zone of said reaction region and which extends upward in a direction generally inclined with respect to a vertical direction and opens to an upper space.

3. The apparatus as defined in claim 1, wherein, with respect to angular positions of outer and inner ends of a lower part of said vane around a center axis of said reactor vessel or said reaction region, the outer end of the lower part of the vane residing backward in a direction of deflection of said flow is located at an angular position forward in the direction of deflection, relative to the inner end of the lower part of the vane residing forward in said direction of deflection, or wherein proximal end portions of the adjacent vanes supported by said support are superimposed as seen in their plan views, so that an overlapping area (η) of the adjacent vanes is formed in a periphery of said support.

4. The apparatus as defined in claim 1, wherein said angular interval is set to be an angle in a range from 10 degrees to 60 degrees.

5. The apparatus as defined in claim 1, wherein each of said vanes is a curved plate defining the curved fluid path, which deflects the gypsum powder upwardly moving together with said flow, toward the radially outward and circumferential direction.

6. A gypsum treating method for use by the apparatus of claim 1,
wherein the upward gaseous fluid flow introduced into said reaction region from said bottom surface of the reaction region is guided toward the radially outward and circumferential direction of the reaction region by said vane, and the gypsum powder is fluidized in the radially outward and circumferential direction of the reaction region, owing to deflection of said flow, whereby the gypsum powder is energized in a circumferential direction of a body of the reactor vessel, or movement of the gypsum powder in the circumferential direction is augmented in a vicinity of said inner wall surface.

7. A gypsum treating method for use by the apparatus of claim 1,
wherein said inlet port is connected to an apparatus for gypsum calcination or a gypsum calciner through a gypsum supply passage, so that said reaction region is fed with the calcined gypsum produced by the apparatus for gypsum calcination or the gypsum calciner, whereby a treatment for modifying or homogenizing the calcined gypsum is performed.

8. The method as defined in claim 6, wherein air or gas regulated in a predetermined temperature and/or a predetermined humidity, or humid air or humid gas containing moisture equal to or greater than a predetermined quantity of moisture content is introduced into said reaction region as said upward gaseous fluid flow.

9. The method as defined in claim 7, wherein air or gas regulated in a predetermined temperature and/or a predetermined humidity, or humid air or humid gas containing moisture equal to or greater than a predetermined quantity of moisture content is introduced into said reaction region as said upward gaseous fluid flow.

10. A gypsum treating apparatus including a reactor vessel, an inlet port for gypsum powder and a gaseous fluid flow supply port, the reactor vessel having an inner wall surface with a circular or annular horizontal cross-section or configuration, said inlet port being configured to feed gypsum powder into a reaction region in the reactor vessel, and said gaseous fluid flow supply port being positioned in a bottom part of the reaction region and configured to provide an upward gaseous fluid flow in the reaction region to agitate the gypsum powder accumulated in the bottom part of the reaction region; comprising:
a plurality of stationary vanes extending toward said inner wall surface from a support which is positioned in a center area of the reaction region,
wherein the vanes are spaced from each other at an angular interval in a circumferential direction of said reaction region and the vanes are spaced apart at a horizontal distance from said inner wall surface to produce a circumferentially directed movement of the gypsum powder in a vicinity of the inner wall surface;
wherein said vanes are positioned at a level at which the vanes are at least partially embedded in the gypsum powder accumulated in the reaction region, the adjacent vanes being configured to form a fluid path therebetween into which said flow spouted from a bottom surface of the reaction region is introduced and in which the gypsum powder is fluidized by the flow, and the fluid path being inclined to deflect said flow toward a radially outward and circumferential direction of said reaction region; and
wherein said reactor vessel is provided with a partition wall defining said bottom surface of said reaction region, and a plenum chamber supplied with gas for said flow under pressure is formed between the partition wall and a bottom wall of the reactor vessel, and wherein the partition wall has a gas permeability resistance such that a dynamic pressure of the gas supplied to the plenum chamber is converted to a static pressure at least partially and a gas permeability such that the gas is caused to flow therethrough from said chamber into said reaction region in accordance with a difference in a gaseous pressure between said reaction region and said chamber.

11. The apparatus as defined in claim 10, wherein said plenum chamber is divided into a plurality of plenum chamber sections by a partition wall or partition walls, and each of the plenum chamber sections is provided with said gaseous fluid flow supply port for said upward gaseous fluid flow, so that the plenum chamber section selectively introduces said upward gaseous fluid flow into said reaction region.

12. The apparatus as defined in claim 10, wherein a lower edge portion of said vane is curved as seen in its plan view, and an outer end portion of the lower edge portion is spaced at a predetermined horizontal distance (dc) from a circumferential wall of said reactor vessel defining said inner wall surface, and the horizontal distance (dc) is set to be in a range from 0.2× a diameter (da) to 0.05× the diameter (da), wherein the diameter (da) is an inner diameter of said circumferential wall.

13. A gypsum treating method, in which gypsum powder is fed into a reaction region of a reactor vessel having an inner wall surface with a circular or annular horizontal cross-section or configuration, and an upward gaseous fluid flow is spouted from a bottom surface of the reaction region to agitate the gypsum powder accumulated in the reaction region:
wherein a plurality of stationary vanes are supported by a support positioned in a center area of said reaction region and are arranged to be circumferentially spaced at an angular interval from each other;
wherein said vanes are positioned at a level at which the vanes are at least partially embedded in the gypsum powder accumulated in the reaction region, so that the adjacent vanes form a fluid path therebetween into which said flow is introduced and in which the gypsum powder is fluidized by the flow, and said vanes are spaced apart at a horizontal distance from said inner wall surface for a circumferentially directed movement of the gypsum powder in a vicinity of the inner wall surface;
wherein the upward gaseous fluid flow introduced into the reaction region from said bottom surface of the reaction region is guided toward a radially outward and circumferential direction of the reaction region by said vanes, and the gypsum powder is fluidized toward the radially outward and circumferential direction of the reaction region by deflection of said flow, whereby the gypsum powder is energized in a circumferential direction of the reactor vessel, or movement of the gypsum powder in the circumferential direction is augmented in a vicinity of said inner wall surface; and
wherein a partition wall is provided to define the bottom surface of said reaction region, and a plenum chamber supplied with gas for said flow under pressure is formed between the partition wall and a bottom wall of said reactor vessel, and wherein a dynamic pressure of the gas supplied to the plenum chamber is converted to a static pressure at least partially by a gas permeability resistance of said partition wall and the gas in the chamber is introduced into said reaction region as said flow by a gas permeability of the partition wall, in accordance with a difference in a gaseous pressure between the reaction region and the chamber.

14. The method as defined in claim 13, wherein, with respect to angular positions of outer and inner ends of a lower part of said vane around a center axis of said reactor vessel or said reaction region, the outer end of the vane residing backward in a direction of deflection of said flow is located at an angular position forward in the direction of deflection, relative to the inner end of the vane residing forward in said direction of deflection, whereby movement of the flow directed toward the radially outward direction is restricted so as not to impede movement of the gypsum powder toward the circumferential direction of the reactor vessel or the reactor region; or wherein proximal end portions of the adjacent vanes are superimposed as seen in their plan views, so that an overlapping area ($\eta$) of the adjacent vanes is formed in an outer peripheral zone of the lower end portion of said support, whereby said flow is prevented from blowing upward in a vicinity of said support.

15. The method as defined in claim 13, wherein said plenum chamber is divided into a plurality of plenum chamber sections by a partition wall or partition walls, and each of the plenum chamber sections is selectively fed with said gas so that said flow is provided in said reactor region by each of the chamber sections.

16. The method as defined in claim 13, wherein said reaction region is fed with said gypsum powder which is the calcined gypsum produced by an apparatus for gypsum calcination or a gypsum calciner, and a treatment for modifying or homogenizing the calcined gypsum is performed with agitation of the gypsum powder of the calcined gypsum by said flow.

17. The method as defined in claim 13, wherein air or gas regulated in a predetermined temperature and/or a predetermined humidity, or humid air or humid gas containing moisture equal to or more than a predetermined quantity of moisture is introduced into said reaction region as said flow.

18. The method as defined in claim 13, wherein a dehydration reaction or a hydration reaction of gypsum dihydrate and/or anhydrous gypsum contained in said gypsum powder is caused to progress, so that a modification treatment or homogenization treatment of the gypsum powder is carried out.

19. The method as defined in claim 13, wherein modification or homogenization of the gypsum powder, incorporation of moisture into the gypsum powder, exposure treatment of the gypsum powder, mixing of an additive in the gypsum powder, calcination of the gypsum powder, or adjustment of a moisture content in the gypsum powder is performed.

20. The method as defined in claim 13, wherein a lower edge portion of said vane is curved as seen in its plan view, and an outer end portion of the lower edge portion is spaced at a predetermined horizontal distance (dc) from a circumferential wall of said reactor vessel defining said inner wall surface, and the horizontal distance (dc) is set to be in a range from 0.2× a diameter (da) to 0.05× the diameter (da), wherein the diameter (da) is an inner diameter of said circumferential wall.

* * * * *